(12) United States Patent
Lance et al.

(10) Patent No.: US 11,030,586 B2
(45) Date of Patent: *Jun. 8, 2021

(54) DISPLAYING A PLURALITY OF CALENDAR ENTRIES

(71) Applicant: International Business Machines Corporation, Armonk, NY (US)

(72) Inventors: John M. Lance, Littleton, MA (US); Deborah E. Maher, Chigaco, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/288,718

(22) Filed: Feb. 28, 2019

(65) Prior Publication Data

US 2019/0197493 A1 Jun. 27, 2019

Related U.S. Application Data

(63) Continuation of application No. 15/017,082, filed on Feb. 5, 2016, now Pat. No. 10,282,706, which is a continuation of application No. 13/104,834, filed on May 10, 2011, now Pat. No. 9,324,060.

(51) Int. Cl.
| | |
|---|---|
| *G06F 3/048* | (2013.01) |
| *G06Q 10/10* | (2012.01) |
| *G06F 3/0484* | (2013.01) |
| *G06F 3/0485* | (2013.01) |
| *G06F 3/0486* | (2013.01) |

(52) U.S. Cl.
CPC ....... *G06Q 10/1095* (2013.01); *G06F 3/0485* (2013.01); *G06F 3/0486* (2013.01); *G06F 3/04847* (2013.01); *G06Q 10/1093* (2013.01)

(58) Field of Classification Search
CPC ............ G06Q 10/1095; G06Q 10/1093; G06F 3/04847; G06F 3/0485; G06F 3/0486
USPC ........................................................ 715/201
See application file for complete search history.

(56) References Cited

U.S. PATENT DOCUMENTS

| | | | |
|---|---|---|---|
| 5,838,317 A | 11/1998 | Bolnick et al. | |
| 6,850,255 B2 | 2/2005 | Muschetto | |
| 6,940,532 B1 | 9/2005 | Fukui et al. | |
| 6,988,128 B1 | 1/2006 | Alexander et al. | |

(Continued)

OTHER PUBLICATIONS

IBM Authors (undisclosed); Ttl: System and Method for Associating Priorities With Calendar Events; Mar. 29, 2006; Database: ip.com; ip.com No. IPCOM000135080D.

(Continued)

*Primary Examiner* — Renee D Chavez
*Assistant Examiner* — Jianmei F Duckworth
(74) *Attorney, Agent, or Firm* — Fabian VanCott; Steven L. Nichols

(57) ABSTRACT

Displaying multiple calendar entries includes dividing the calendar entries into multiple different priority levels in a computerized calendaring system implemented by at least one processor; displaying at least some of the calendar entries in each priority level in a separate strip associated with that priority level in a user interface of the computerized calendaring system; and advancing a position of each displayed calendar entry in each strip with the computerized calendaring system to reflect the passage of time.

15 Claims, 7 Drawing Sheets

(56) References Cited

U.S. PATENT DOCUMENTS

| | | | |
|---|---|---|---|
| 7,703,048 B2 | 4/2010 | Alford, Jr. et al. | |
| 7,757,176 B2 | 7/2010 | Vakil et al. | |
| 8,103,974 B2 | 1/2012 | Rhee et al. | |
| 2001/0040590 A1* | 11/2001 | Abbott | G06F 1/163 715/700 |
| 2003/0061087 A1 | 3/2003 | Srimuang | |
| 2003/0130882 A1 | 7/2003 | Shuttleworth | |
| 2003/0214534 A1* | 11/2003 | Uemura | G06Q 10/109 715/805 |
| 2004/0070627 A1 | 4/2004 | Shahine et al. | |
| 2004/0243942 A1 | 12/2004 | Cortright | |
| 2004/0244005 A1 | 12/2004 | Ancier | |
| 2005/0027696 A1 | 2/2005 | Swaminathan | |
| 2005/0177404 A1 | 8/2005 | Hyttinen | |
| 2006/0271419 A1 | 11/2006 | O'Sullivan | |
| 2007/0061712 A1 | 3/2007 | Bodin et al. | |
| 2007/0168892 A1 | 7/2007 | Brush et al. | |
| 2007/0198314 A1* | 8/2007 | Andrew | G06Q 10/109 705/7.19 |
| 2008/0033779 A1* | 2/2008 | Coffman | G06Q 10/109 705/7.18 |
| 2008/0126951 A1 | 5/2008 | Sood | |
| 2008/0270914 A1 | 10/2008 | Kikin-Gil et al. | |
| 2009/0006161 A1 | 1/2009 | Chen et al. | |
| 2009/0083106 A1* | 3/2009 | Bhogal | G06Q 10/1095 705/7.19 |
| 2009/0106036 A1 | 4/2009 | Tamura et al. | |
| 2009/0165022 A1 | 6/2009 | Madsen et al. | |
| 2009/0171988 A1 | 7/2009 | Kikin-Gil | |
| 2009/0204464 A1* | 8/2009 | Mujkic | G06Q 10/1095 705/7.19 |
| 2009/0217176 A1 | 8/2009 | Coulomb et al. | |
| 2009/0265623 A1 | 10/2009 | Kho et al. | |
| 2009/0271716 A1 | 10/2009 | Jones et al. | |
| 2009/0288030 A1 | 11/2009 | Wahl et al. | |
| 2009/0299810 A1 | 12/2009 | Jardine et al. | |
| 2009/0313570 A1 | 12/2009 | Po | |
| 2010/0057565 A1 | 3/2010 | Au-Yeung | |
| 2010/0070589 A1 | 3/2010 | Shaw et al. | |
| 2010/0169146 A1 | 7/2010 | Hoyne et al. | |
| 2010/0275148 A1 | 10/2010 | Pan et al. | |
| 2011/0054976 A1* | 3/2011 | Adler | G06Q 10/109 705/7.18 |
| 2011/0196774 A1 | 8/2011 | Scianna et al. | |
| 2011/0238671 A1 | 9/2011 | Walker et al. | |
| 2011/0252351 A1 | 10/2011 | Sikora et al. | |
| 2011/0320235 A1 | 12/2011 | Bak et al. | |
| 2012/0272181 A1 | 10/2012 | Rogers | |

OTHER PUBLICATIONS

MSDN Blogs "Templates in OneNote" posted by Jeffcardon, May 21, 2008, download from http://blogs.msdn.com/b/onenotetips/archive/2008/05/21/templates-in-onenote.aspx.

"New Views in: MYN ClearContext", Michael Linenberger, www.michallinenberger.com/myn-book/support/CC-UserGuide-Views.html, Apr. 11, 2008, 2 pages.

"Sorting by Due Date in Outlook", www.davidco.com/forum/archive/index.php/t-2311.html, 2003-2008, 2 pages.

List of IBM Patents or Patent Applications Treated as Related; Feb. 28, 2019; pp. 1-2.

* cited by examiner

Fig. 2

Low Priority (108)

- 102-3: Wed 7/13/11 12p-2p Team Lunch
- 102-4: Thu 7/14/11 10a-11a Partner Call
- 102-5: Fri 7/15/11 9:30a-10a Con. Call with Herb
- 102-6: Fri 7/15/11 4:30p-5p Go over plan with Bill
- 102-7: Mon 7/18/11 2p-3p Analyst Call
- 102-8: Wed 7/20/11 12p-2p Team Lunch
- 102-9: Thu 7/21/11 1p-3p

High Priority (112)

- 106-1: Fri 7/16/11 10a-12p Presentation to Partners
  - Importance: Phillipe required; Phillipe presenting; Ted required
  - Related Info: Re: Con call; Presentation; Partner call
  - *Preparations recommended

- 106-2: Fri 7/16/11 10a-12p Presentation to Partners
  - Importance: Phillipe required; Phillipe presenting; Ted required
  - Related Info: Re: Con call; Presentation; Partner call
  - *Preparations recommended

Medium Priority (110)

- 104-1: Thu 7/15/11 3p-4p Team Meeting — Phillipe is required; Regular meeting
- 104-2: Thu 7/15/11 4:30p-5p One on One — Phillipe is required; Ted is required; Regular meeting; Frequently cancelled
- 104-3: Mon 7/18/11 1p-2p Team Follow-up — Phillipe is required

| Availability: | Mon 7/11 | Tue 7/12 | Wed 7/13 | Thu 7/14 | Fri 7/15 | Sat 7/16 | Sun 7/17 | Action Required |
|---|---|---|---|---|---|---|---|---|
| | 8a-9a | 10a-11a | 11a-12p | 2p-3p | 3p-4p | 4p-5p | | |

Now: Tue 7/13/11 11:55 am

High Priority

306-1 — Fri 7/16/11 10a-12p Presentation to Partners
Importance: Phillipe required, Phillipe presenting, Ted required
Related Info: Re: Con call, Presentation, Partner call
* Preparations recommended 306-2 — Tue 7/20/11 10a-12p Presentation to Partners
Importance: Phillipe required
Related Info: Re: Con call

Medium Priority

304-1 — Thu 7/15/11 3p-4p Team Meeting
Phillipe is required
Regular meeting 304-2 — Thu 7/15/11 4p-5p One on One
Phillipe is required
Ted is required
Regular meeting
Frequently cancelled

Low Priority

302-1 — Wed 7/13/11 12p-2p Team Lunch
302-2 — Thu 7/14/11 10a-11a Partner Call
302-3 — Fri 7/15/11 9:30a-10a Con. Call with Herb
302-4 — Fri 7/15/11 4:30p-5p Go over plan with Bill
302-5 — Mon 7/18/11 2p-3p Analyst Call

No Deadline

High Priority

306-3 — Draft Yearly Goals
Assigned by Ted

Medium Priority

304-3 — Submit Expenses

Low Priority

302-6 — Send email about tickets
302-7 — Contact Vern about move

*Fig. 3*

| Availability: | Mon 7/11 | Tue 7/12 | Wed 7/13 | Thu 7/14 | Fri 7/15 | Sat 7/16 | Sun 7/17 | Action Required |
|---|---|---|---|---|---|---|---|---|
| | 8a-9a 10a-11a 11a-12p 2p-3p 3p-4p 4p-5p | | | | | | | |

Now: Tue 7/13/11 11:55 am

High Priority

**Fri 7/16/11 10a-12p
Presentation to Partners**

Importance    Related Info
Phillipe required    Re: Con call
Phillipe presenting    Presentation
Ted required    Partner call
S. Daryn is required    RE: Important...
F. Adams is required    Did you see...
     Planning

* Preparations recommended

Discovery
S. Daryn previously worked for Renovations.
North East Partners sales are up.
Gartner previously posted a positive review of
product X and product Y

Low Priority

Wed 7/13/11 12p-2p Team Lunch

Thu 7/14/11 10a-11a Partner Call

Fri 7/15/11 9:30a-10a Con. Call with Herb

Fri 7/15/11 4:30p-5p Go over plan with Bill

Mon 7/18/11 2p-3p Analyst Call

Medium Priority

Thu 7/15/11 3p-4p
Team Meeting
Phillipe is required
Regular meeting

Thu 7/15/11 4p-5p
One on One
Phillipe is required
Ted is required
Regular meeting
Frequently cancelled

No Deadline

High Priority

Draft Yearly Goals

Assigned by Ted

Medium Priority

Submit Expenses

Low Priority

Send email about tickets

Contact Vern about move

*Fig. 4*

| Availability: | Mon 7/11 | Tue 7/12 | Wed 7/13 | Thu 7/14 | Fri 7/15 | Sat 7/16 | Sun 7/17 | Action Required |
|---|---|---|---|---|---|---|---|---|
| | 8a-9a | 10a-11a | 11a-12p | 2p-3p | 3p-4p | 4p-5p | | |

Now: Tue 7/13/11 11:55 am

Low Priority — High Priority — Medium Priority — Invitation: Group Mtg.
Fri. 7/16/11
11a-11:30a
*Conflicts with Presentation to Partners*
Phillippe is Optional
Rec. Action:
[Decline] [More....]

- Wed 7/13/11 12p-2p Team Lunch (302-1)
- Thu 7/14/11 10a-11a Partner Call (302-2)
- Fri 7/15/11 9:30a-10a Con. Call with Herb (302-3)
- Fri 7/15/11 4:30p-5p Go over plan with Bill (302-4)
- Mon 7/18/11 2p-3p Analyst Call (302-5)

Fri 7/16/11 10a-12p Presentation to Partners (306-1)
Importance
Phillipe required
Phillipe presenting
Ted required
Related Info
☑ Re: Con call
▭ Presentation
▮ Partner call
* Preparations recommended

Tue 7/20/11 10a-12p Presentation to Partners
Importance
Phillipe required
Related Info
☑ Re: Con call

Thu 7/15/11 3p-4p Team Meeting (304-1)
Phillipe is required
Regular meeting

Thu 7/15/11 4p-5p One on One (304-2)
Phillipe is required
Ted is required
Regular meeting
Frequently cancelled

No Deadline

Low Priority — High Priority (306-3) — Medium Priority

- Send email about tickets (302-6)
- Contact Vern about move (302-7)

Draft Yearly Goals
Assigned by Ted

Submit Expenses (304-3)

*Fig. 5*

DISPLAYING A PLURALITY OF CALENDAR ENTRIES

BACKGROUND

Aspects of the present specification relate to computerized calendar systems. In particular, the present specification relates to the display of multiple calendar entries by a computerized calendar system.

Electronic calendar applications allow users to electronically track scheduled events through the storage of separate calendar entries for separately scheduled events. A calendar entry may contain information about an associated scheduled event, including the date, time, location, invited participants of the event, and/or a description of the event. Calendar applications and scheduled event data are often accessible through a network connection to a server, which enhances their utility for users desiring to access calendar information from various different locations.

Most electronic calendar applications display scheduled events to users chronologically. That is, users of today's electronic calendar applications typically view their scheduled events in the same way that they would view scheduled events on a paper calendar or planner. Scheduled events are organized in the context of where they fall within the scope of upcoming hours, days, weeks, months, and years.

BRIEF SUMMARY

A method of displaying a plurality of calendar entries includes: dividing the calendar entries into a plurality of different priority levels in a computerized calendaring system implemented by at least one processor; displaying at least some of the calendar entries of each priority level in a separate strip associated with that priority level in a user interface of the computerized calendaring system; and advancing a position of each displayed calendar entry in each strip with the computerized calendaring system to reflect the passage of time.

A method of displaying a plurality of calendar entries includes: dividing the calendar entries into a plurality of groups in a computerized calendaring system implemented by at least one processor, each group being associated with a different priority level; for each group, displaying a portion of the calendar entries of that group in a separate strip of a user interface of the computerized calendaring system according to a chronological order; and controlling the user interface of the computerized calendaring system to cause each strip to independently scroll through a display of the calendar entries of the group associated with the strip according to the chronological order for that group and the passage of time.

A computerized calendar system includes a processor communicatively coupled to a memory, the memory comprising executable code stored thereon. The executable code, when executed by the processor, causes the processor to: divide a plurality of calendar entries into a plurality of different priority levels; cause at least some of the calendar entries in each priority level to be displayed in a separate strip associated with that priority level in a user interface; and cause a position of each displayed calendar entry in each strip to be advanced to reflect the passage of time.

A computer program product for displaying a plurality of calendar entries includes a tangible computer readable storage medium having computer readable program code embodied therewith. The computer readable program code includes: computer readable program code configured to divide the calendar entries into a plurality of different priority levels; computer readable program code configured to display at least some of the calendar entries in each priority level in a separate strip associated with that priority level in a user interface; and computer readable program code configured to advance a position of each displayed calendar entry in each strip to reflect the passage of time.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

FIG. 2 is a diagram of an illustrative graphic user interface display of multiple calendar entries, according to one example of principles described herein.

FIG. 3 is a diagram of an illustrative graphic user interface display of multiple calendar entries, according to one example of principles described herein.

FIG. 4 is a diagram of an illustrative graphic user interface display of multiple calendar entries, according to one example of principles described herein.

FIG. 5 is a diagram of an illustrative graphic user interface display of multiple calendar entries, according to one example of principles described herein.

Throughout the drawings, identical reference numbers designate similar, but not necessarily identical, elements.

DETAILED DESCRIPTION

Figure 1:
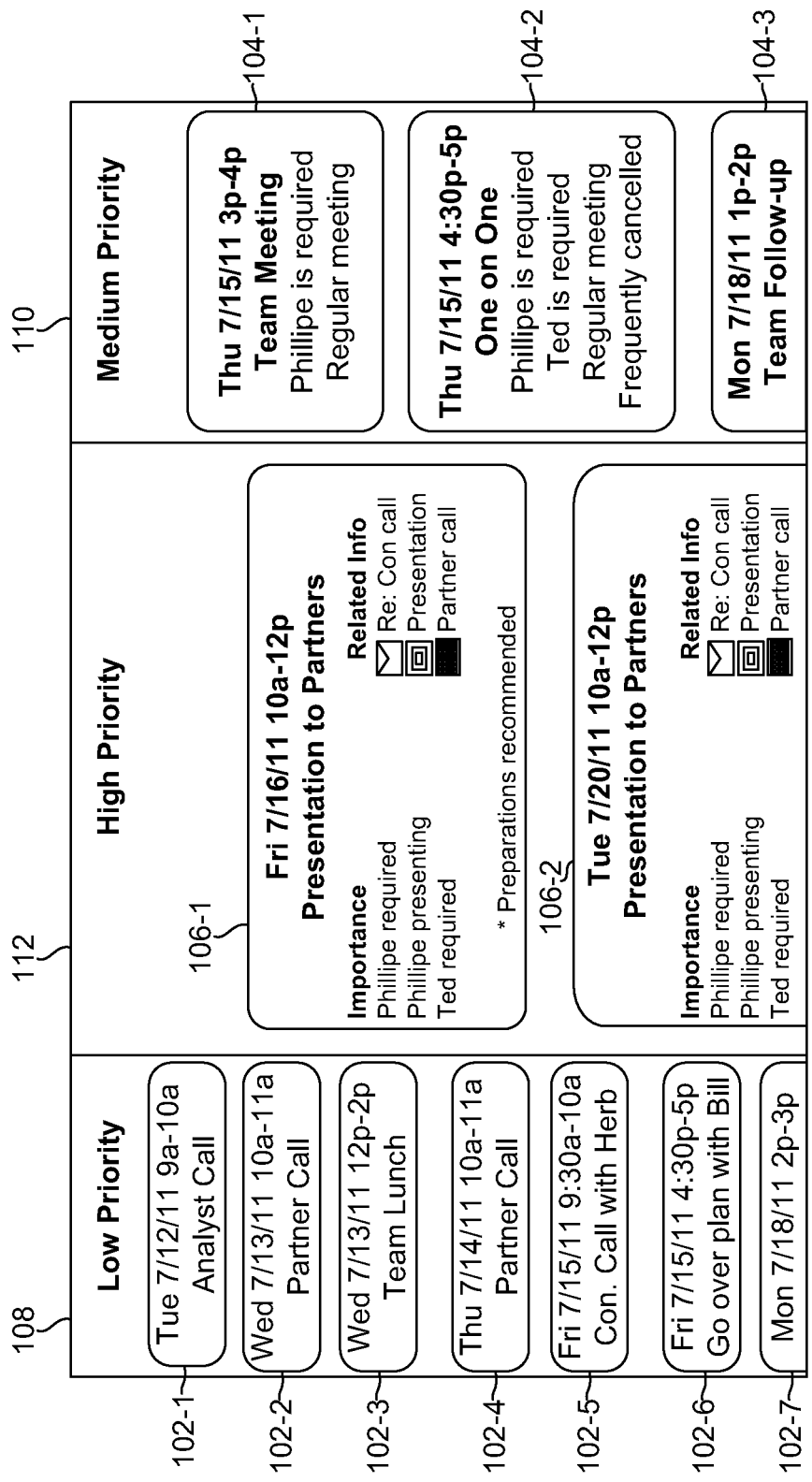
FIG. 1 is a diagram of an illustrative graphic user interface display of multiple calendar entries, according to one example of principles described herein.

The present specification discloses methods, systems, and computer program products of displaying multiple calendar entries in a priority-based, nonlinear manner. As described above, most electronic calendar applications display scheduled events to users linearly. However, this approach to the display of scheduled events has drawbacks. For example, consider a user scheduled to give an important presentation in one week from the current date. In a typical calendar model, the information about the presentation would not be visible unless the calendar application is in a month or list view configuration. Such a view typically reduces the amount of detailed information about the event that is visible. By contrast, the methods, systems, and computer program products of the present specification provide a way to organize calendar entries such that a user may have a single, detailed view of not only calendar entries for the immediate future, but also important calendar entries scheduled further out. Moreover, by displaying the relative priority of each calendar entry, a user of the systems of the present specification may be better informed as to the best appropriation of his or her unscheduled time in preparing for upcoming events.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As used in the present specification and appended claims, the term "calendar entry" refers to an event, task, or note tracked by a calendar system.

As used in the present specification and in the appended claims, the term "strip" refers to an area in which objects are linearly arranged.

FIG. 1 is a diagram of an illustrative graphic user interface of a computerized calendar system, which displays multiple calendar entries (102-1 to 102-7, 104-1 to 104-3, 106-1, 106-2) stored and managed by the computerized calendar system. The calendar entries (102-1 to 102-7, 104-1 to 104-3, 106-1, 106-2) may come from, for example: new calendar entries generated using the computerized calendar system; calendar entries from external calendar systems or calendars for a different user that are federated into the present computerized calendar system using a network or some other applicable communication method; calendar entries generated by external persons or processes to which a user of the computerized calendar system has been invited; an invitation is received in the computerized calendar system; and combinations thereof.

The graphic user interface may be displayed, for example, on a computer monitor of a personal computer or a display screen of a portable electronic device. In the computerized calendaring system of this example, the scheduled calendar entries (102-1 to 102-7, 104-1 to 104-3, 106-1, 106-2) are divided in to three different priority levels: a low priority, a medium priority, and a high priority. Upcoming low priority calendar entries (102-1 to 102-7) are displayed in a low-priority strip (108), upcoming medium priority calendar entries (104-1 to 104-3) are displayed in a medium priority strip (110), and upcoming high priority calendar entries (106-1, 106-2) are displayed in a high priority strip (112).

The assigned priority level for each calendar entry (102-1 to 102-7, 104-1 to 104-3, 106-1, 106-2) may be determined and input manually by a user or administrator of the computerized calendar system. For example, whenever a calendar entry (102-1 to 102-7, 104-1 to 104-3, 106-1, 106-2) is added to the user's calendar or modified, the computerized calendar system may prompt the user to identify a priority level for that calendar entry (102-1 to 102-7, 104-1 to 104-3, 106-1, 106-2).

Additionally or alternatively, the priority level of calendar entries (102-1 to 102-7, 104-1 to 104-3, 106-1, 106-2) may be determined automatically by the computerized calendaring system. For example, whenever a calendar entry (102-1 to 102-7, 104-1 to 104-3, 106-1, 106-2) is added to the user's calendar or modified, the computerized calendar system may execute a rule-based function to determine an appropriate priority level for the calendar entry (102-1 to 102-7, 104-1 to 104-3, 106-1, 106-2). Such rule-based functions may take into account, but are not limited to, factors such as attendance information for the calendar entry (102-1 to 102-7, 104-1 to 104-3, 106-1, 106-2), a role of the user in the event represented by the calendar entry (102-1 to 102-7, 104-1 to 104-3, 106-1, 106-2), the identity of the person or entity creating or directing the event represented by the calendar entry (102-1 to 102-7, 104-1 to 104-3, 106-1, 106-2), the degree to which the calendar entry conflicts with other calendar entries (102-1 to 102-7, 104-1 to 104-3, 106-1, 106-2) for the user, and combinations thereof. Additionally or alternatively, the priority level of calendar entries (102-1 to 102-7, 104-1 to 104-3, 106-1, 106-2) may be determined using a third-party service that separately evaluates and assigns a priority level to each of the calendar entries.

In some examples, the priority level of calendar entries (102-1 to 102-7, 104-1 to 104-3, 106-1, 106-2) may be stored in the context of a priority hierarchy. For instance, a calendar entry (102-1 to 102-7, 104-1 to 104-3, 106-1, 106-2) that would otherwise be classified as high-priority may be classified as medium-priority if it conflicts with a pre-existing high-priority event. Similarly, a medium-priority calendar entry (102-1 to 102-7, 104-1 to 104-3, 106-1, 106-2) may become a high-priority calendar entry (102-1 to 102-7, 104-1 to 104-3, 106-1, 106-2) if a conflicting high-priority calendar entry is cancelled or rescheduled.

The calendar entries (102-1 to 102-7, 104-1 to 104-3, 106-1, 106-2) within each strip (108, 110, 112) are arranged chronologically. That is, the calendar entries (102-1, 104-1, 106-1) at the top of each strip (108, 110, 112) are the entries within each priority level that will occur the soonest or have the soonest deadlines, and the calendar entries (102-7, 104-3, 106-2) at the bottom of each strip (108, 110, 112) are the entries currently displayed by the graphical user interface that are scheduled later than the other calendar entries displayed in that strip (108, 110, 112).

The user interface may be set up so that the user can easily manipulate the calendar entries (102-1 to 102-7, 104-1 to 104-3, 106-1, 106-2) graphically to reschedule entries (102-1 to 102-7, 104-1 to 104-3, 106-1, 106-2) or make changes to priority levels. For example, to reschedule a calendar entry (102-1 to 102-7, 104-1 to 104-3, 106-1, 106-2), the user may drag the calendar entry (102-1 to 102-7, 104-1 to 104-3, 106-1, 106-2) to a new position in the chronological order displayed by the interface. This action may cause the interface to prompt the user to enter a new date and time for the calendar entry (102-1 to 102-7, 104-1 to 104-3, 106-1, 106-2) and/or contextually infer a new date and time for the calendar entry (102-1 to 102-7, 104-1 to 104-3, 106-1, 106-2). Additionally or alternatively, in some examples the user may also be able to rearrange the placement of the strips (108, 110, 112) using drag-and-drop functionality.

As shown in FIG. 1, the size of each displayed calendar entry (102-1 to 102-7, 104-1 to 104-3, 106-1, 106-2) in the user interface correlates with the priority level of that calendar entry (102-1 to 102-7, 104-1 to 104-3, 106-1, 106-2). Thus, the calendar entries (102-1 to 102-7) categorized as low-priority occupy the smallest amount of display real estate, and the calendar entries (106-1, 106-2) categorized as high-priority occupy the largest amount of display real estate. While each calendar entry (102-1 to 102-7, 104-1 to 104-3, 106-1, 106-2) displayed in a particular strip (108, 110, 112) is the same size in FIG. 1, in other examples the size of displayed calendar entries (102-1 to 102-7, 104-1 to 104-3, 106-1, 106-2) may also vary within the strips (108, 110, 112), depending on a determined priority of each entry (102-1 to 102-7, 104-1 to 104-3, 106-1, 106-2) and/or an amount of information to be displayed for each entry (102-1 to 102-7, 104-1 to 104-3, 106-1, 106-2).

Additionally, the amount of information displayed about each calendar entry (102-1 to 102-7, 104-1 to 104-3, 106-1, 106-2) is related to the priority level of that calendar entry (102-1 to 102-7, 104-1 to 104-3, 106-1, 106-2). As shown in FIG. 1, low-priority calendar entries (102-1 to 102-7) display the least amount information in this screen of the user interface, and high-priority calendar entries (106-1, 106-2) display the most amount of information, including attendance information, presentation information, and shortcuts to documents related to the meeting.

The position of calendar entries (102-1 to 102-7, 104-1 to 104-3, 106-1, 106-2) within each of the strips (108, 110, 112) advances upward to reflect the passage of time. Thus, as the scheduled date and time for a displayed calendar entry (102-1 to 102-7, 104-1 to 104-3, 106-1, 106-2) approaches and passes, that calendar entry (102-1 to 102-7, 104-1 to 104-3, 106-1, 106-2) moves to the top of its respective strip (108, 110, 112) and out of the display area of the user interface. Movement within each of the strips (108, 110, 112) is independent of any of the other strips.

In addition to this automatic movement of the calendar entries (102-1 to 102-7, 104-1 to 104-3, 106-1, 106-2), a user may also manually scroll through the calendar entries (102-1 to 102-7, 104-1 to 104-3, 106-1, 106-2) of an individual strip (108, 110, 112) to view past or future calendar entries (102-1 to 102-7, 104-1 to 104-3, 106-1, 106-2) that may otherwise be out of the display area for that strip (108, 110, 112). In certain examples, if a user has scrolled through the calendar entries (102-1 to 102-7, 104-1 to 104-3, 106-1, 106-2) of an individual strip (108, 110, 112), the user interface may automatically revert the display of that strip (108, 110, 112) such that the next scheduled calendar entry is positioned at the top of the strip (108, 110, 112) after the user has finished scrolling (e.g., after the expiration of a predetermined amount of time).

Furthermore, for certain users the possibility exists that the amount of data displayed by the user interface may become overwhelming, particularly if many calendar entries (102-1 to 102-7, 104-1 to 104-3, 106-1, 106-2) exist for a relatively short period of time. In such examples, the user may be able to filter the display of calendar entries (102-1 to 102-7, 104-1 to 104-3, 106-1, 106-2) through the user interface. The calendar entries may be filtered using any suitable parameter associated with calendar entries (102-1 to 102-7, 104-1 to 104-3, 106-1, 106-2), including, but not limited to, date, time, place, attendance, meeting organizer or chair, a tag or label, and the like.

FIG. 2 shows an example of the user interface of FIG. 1 after the passage of a day. That is, where FIG. 1 shows an example of how the user interface may appear on the morning of Tuesday, July 12, FIG. 2 shows an example of how the user interface may appear at noon on Wednesday, July 13. In FIG. 2, the top two low-priority calendar entries (102-1, 102-2) of FIG. 1 are now in the past and have moved out of the display area of the user interface. The remaining low-priority calendar entries (102-1 to 102-7) of FIG. 1 have shifted upward in position to reflect that the next low-priority event is a team lunch scheduled for noon of July 13. With that upward shift, two additional low-priority events (102-8, 102-9) have come into view at the bottom of the low-priority strip (108). The calendar entries (104-1 to 104-3, 106-1, 106-2) of the medium-priority and high-priority strips (110, 112) have also moved independently moved upward.

FIG. 3 shows an example of a user interface that behaves consistent with the principles of the user interface in FIGS. 1-2, with additional information displayed. As in FIGS. 1-2, the user interface of FIG. 3 categorizes calendar entries (302-1 to 302-7, 304-1 to 304-3, 306-1 to 306-3) into three priority levels: low priority, medium priority, and high priority. Calendar entries (302-1 to 302-5, 304-1, 304-2, 306-1, 306-2) associated with specific dates and times are arranged chronologically within either a main low-priority strip (308), a main medium-priority strip (310), or a main high-priority strip (312), based on the priority level, date, and time assigned to each calendar entry (302-1 to 302-5, 306-1, 306-2, 304-1, 304-2).

Additionally, the interface includes separate strips (314, 316, 318) which display respective low, medium, and high-priority calendar entries (302-6, 302-7, 304-3, 306-3) that are not associated with specific dates and times. Through the use of these "no deadline" strips (314, 316, 318), a user may view reminders for events or actions that do not chronologically age off of the interface in the same way as the main strips (308, 310, 312). Rather, the calendar entries (302-6, 302-7, 304-3, 306-3) in the "no deadline" strips (314, 316, 318) may be manually dismissed by the user when they are no longer needed.

Additionally, the user interface of FIG. 3 displays a constant indicator (320) of the current time and date, a navigable interactive display (322) of currently available (i.e. unscheduled) time slots, and a notification area (324) informing the user of items for which the user may take action and related notifications. For example, meeting invitations, reschedule requests, conflict notifications, meeting reminders, and the like may appear in the notification area (324).

FIG. 4 is a diagram of the user interface in which a view of one of the calendar entries (306-1) has been expanded to display additional information related to the calendar entry (306-1). In certain examples, the user may select any of calendar entries (302-1 to 302-7, 304-1 to 304-3, 306-1 to 306-3) to view additional details and/or links to files associated with the calendar entry (302-1 to 302-7, 304-1 to 304-3, 306-1 to 306-3).

FIG. 5 is a diagram of the user interface of FIGS. 3-4 in which the user interface prompts the user in the notification area (324) to take action with respect to a received invitation (502) for a new calendar entry. The notification area (324) displays the time and date of the proposed calendar entry, identifies a conflict with an existing calendar entry (306-1), recommends the user decline the invitation, and provides buttons (504, 506) for the user to select an action to take with respect to the invitation. In certain examples, the computerized calendar system may assign a priority level to the calendar entry proposed by the received invitation (502) using the same criteria for which priority levels are assigned to existing calendar entries (302-1 to 302-7, 304-1 to 304-3, 306-1 to 306-3) and generate a recommendation of whether to accept or decline the invitation (502) based on the priority of the proposed calendar entry and the priority of any conflicting existing calendar entry (302-1 to 302-7, 304-1 to 304-3, 306-1 to 306-3).

Figure 6:
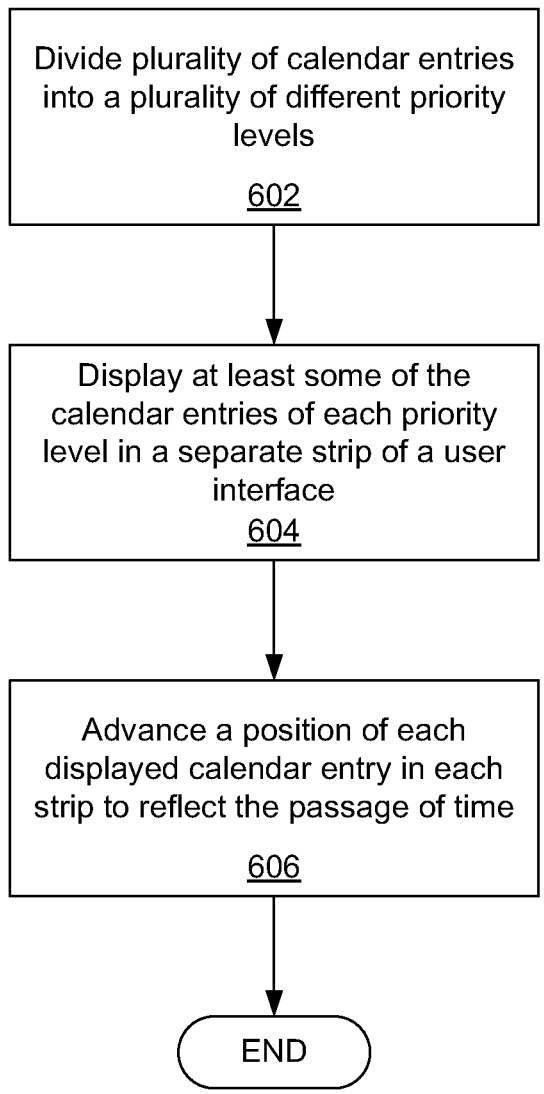
FIG. 6 is a flow diagram of an illustrative method of displaying multiple calendar entries, according to one example of principles described herein.

FIG. 6 is a flowchart of an example method (600) of displaying multiple calendar entries, according to the principles of the present specification. The method (600) may be performed, for example, by a computerized calendar system implemented by at least one processor. According to the method (600), a plurality of calendar entries is divided (block 602) into a plurality of different priority levels. At least some of the calendar entries of each priority level are displayed (block 604) in a separate strip associated with that priority level in a user interface of the computerized calendaring system. The position of each displayed calendar entry is advanced (block 606) to reflect the passage of time. As described above, the advancement of calendar entry positions in each strip may occur independent of such advancement in any other strip.

Figure 7:
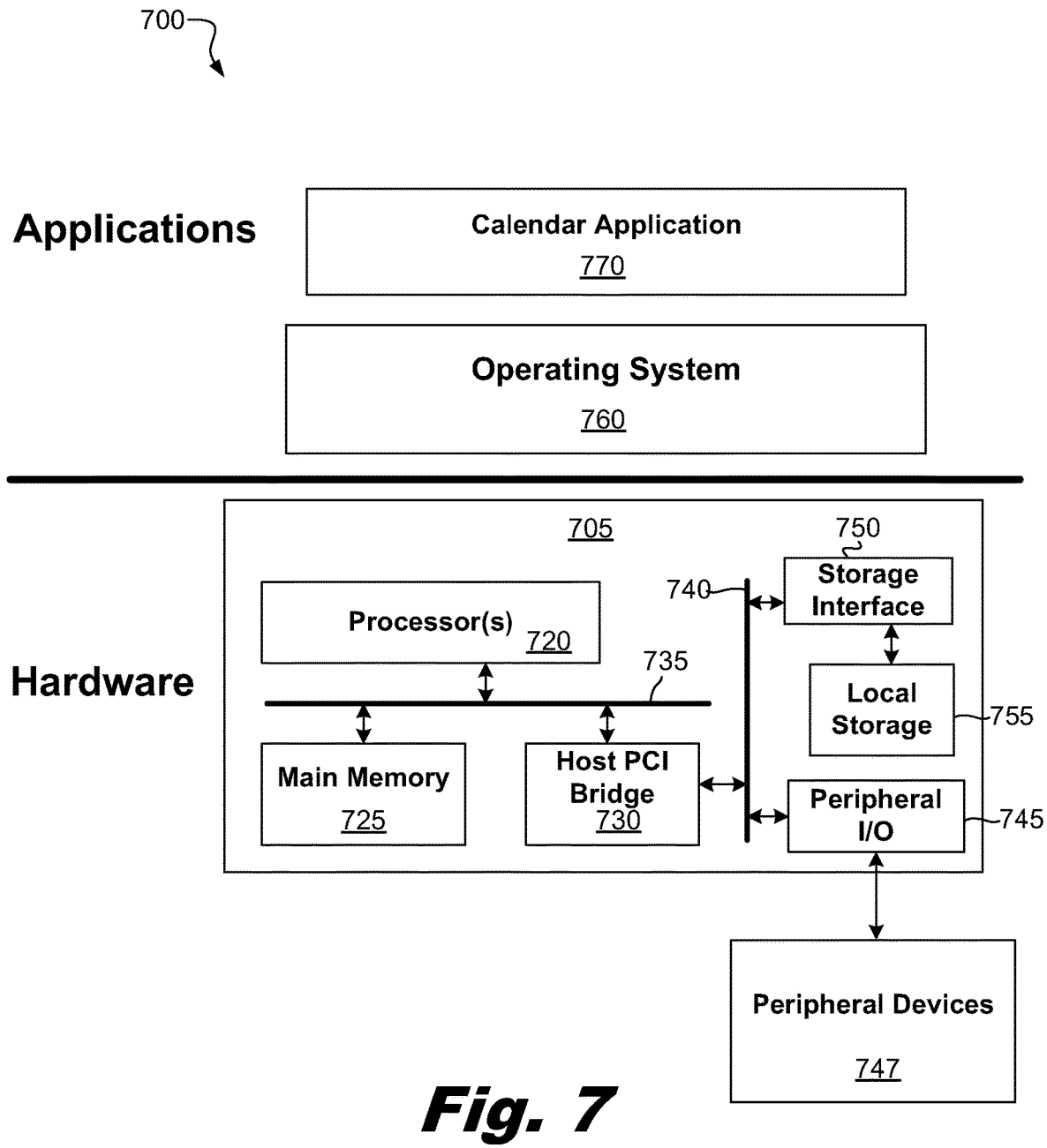
FIG. 7 is a block diagram of an illustrative computing device that may implement a computerized calendaring system for displaying multiple calendar entries, according to one example of principles described herein.

FIG. 7 is a block diagram of an illustrative computing device (700) that may be used to execute a computerized calendar program as a calendar server, a calendar client device, or a standalone calendar device to implement a computerized calendar system.

The hardware platform (705) of the computing device (700) may include at least one processor (720) that executes code stored in the main memory (725). In certain embodiments, the processor (720) may be a multi-core processor having multiple independent central processing units (CPUs), with each CPU having its own L1 cache and all CPUs sharing a common bus interface and L2 cache. Alternatively, the processor (720) may be a single-core processor.

The at least one processor (720) may be communicatively coupled to the main memory (725) of the hardware platform and a host peripheral control interface bridge (PCI) (730) through a main bus (735). The main memory (725) may include dynamic non-volatile memory, such as random access memory (RAM). The main memory (725) may store executable code and data that is obtainable by the processor (720) through the main bus (735).

The host PCI bridge (730) may act as an interface between the main bus (735) and a peripheral bus (740) used to communicate with peripheral device interfaces (745). Among these peripheral devices (747) that interface to the processor (780) may be a network interface controller, external human interface devices (e.g., monitor, keyboard, mouse, touch screen, speaker, microphone), other external devices (e.g., external storage, dongles, specialized tools), serial buses (e.g., Universal Serial Bus (USB)), and the like. A local storage interface (750) for communicating with local storage devices (755) may also communicate with the peripheral bus (740).

The present configuration of the hardware platform (705) is merely illustrative of one type of hardware platform (705) that may be used in connection with the principles described in the present specification. The hardware platform (705) shown in the lower half of the diagram of FIG. 7 is configured to implement the elements of application functionality shown in the upper half of the diagram of FIG. 7. Thus, as shown in FIG. 7, an operating system (760) program is executed directly by the hardware platform (705). The operating system (762) may interact with and manage the performance of hardware resources in the hardware platform (705), including the processor(s) (720), the main memory (725), and the peripheral devices (747, 755). Thus, the operating system (760) controls the execution of computer programs by the processor(s) (720). Among these computer programs may include a calendar application (770) which causes the processor(s) (720) to implement a computerized calendar system, such as the computerized calendar system described herein. As part of the execution of the calendar application (770), a user interface such as the user interfaces described in relation to FIGS. 1-6 may be displayed by one of the peripheral devices (747).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of displaying a plurality of calendar entries, comprising:
    dividing the calendar entries into a plurality of different priority levels in a computerized calendaring system implemented by at least one processor;
    displaying at least some of the calendar entries of each of the priority levels in a separate strip associated with that priority level in a user interface of the computerized calendaring system, wherein the separate strips of each priority level are laterally side-by-side in the user interface;
    in response to a determination that a newly-entered, high-priority event conflicts with a pre-existing, high-priority event, down-grading a classification of the newly-entered, high-priority event;
    displaying an amount of information for each of the calendar entries, wherein the amount of information displayed for each of the calendar entries is based on the priority level of the calendar entries where lower-priority calendar entries comprise less information displayed and higher-priority calendar entries comprise more information displayed;
    displaying a notification area in juxtaposition to at least one of the calendar entries, the notification area comprising a selectable button to allow a user to take an action through the selectable button;
    wherein displaying at least some of the calendar entries in each priority level in a separate strip of the user interface comprises:
        for at least one of the displayed calendar entries, displaying a shortcut to a file separate from and related to one of the displayed calendar entries; and
    displaying a persistent indication of unscheduled time in a separate strip of the user interface.

2. The method of claim 1, comprising in response to a determination that a pre-existing, high-priority event has been modified to remove a conflict, up-grading a classification of a medium-priority event to a high-priority event.

3. The method of claim 1, wherein advancing a position of each displayed calendar entry in each strip to reflect the passage of time comprises:
    moving a first of the calendar entries out of a field of view of the strip corresponding to the priority level of the first of the calendar entries in response to a scheduled time of the first of the calendar entries occurring in the past.

4. The method of claim 1, comprising prompting a user to identify a priority level for each of the calendar entries whenever the calendar entries are added or modified, dividing the calendar entries into the plurality of different priority levels based on input from a user, dividing the calendar entries into the plurality of different priority levels automatically based on at least one predefined rule, or combinations thereof.

5. The method of claim 1, comprising:
    in response to a change in a calendar entry, executing a rule-based function to determine an appropriate priority level for the calendar entry,
    wherein the rule-based function applies a number of factors comprising attendance information for the calendar entry, a role of a user in the event represented by the calendar entry, an identity of the person or entity creating the event represented by the calendar entry, a degree to which the calendar entry conflicts with other calendar entries, or combinations thereof.

6. The method of claim 1, further comprising
    scrolling a strip in response to a user command, and
    wherein after the user has ceased scrolling the strip, automatically reverting the strip after a predetermined period of time.

7. The method of claim 1, further comprising displaying for each priority level, an additional strip for calendar entries with no associated deadline.

8. A method of displaying a plurality of calendar entries, comprising:
- dividing the calendar entries into a plurality of different priority levels in a computerized calendaring system implemented by at least one processor;
- for each priority level, displaying a portion of the calendar entries for that priority level in a separate strip of a user interface of the computerized calendaring system according to a chronological order, wherein each calendar entry displays a date and time;
- displaying a persistent indication of unscheduled time in a separate strip of the user interface; and
- displaying an amount of information for each of the calendar entries, wherein the amount of information displayed for each of the calendar entries is based on the priority level of the calendar entries where lower-priority calendar entries comprise less information displayed and higher-priority calendar entries comprise more information displayed;
- in response to a determination that a newly-entered, high-priority event conflicts with a pre-existing, high-priority event, down-grading a classification of the newly-entered, high-priority event;
- in response to a determination that a pre-existing, high-priority event has been modified to remove a conflict, up-grading a classification of a medium-priority event to a high-priority event;
- wherein the information displayed for the higher-priority calendar entries comprises attendance information, presentation information, or shortcuts to documents related to a meeting;
- in response to a user command, scrolling a strip, and
- after scrolling a strip, automatically reverting the strip after a predetermined period of time.

9. The method of claim 8, comprising controlling the user interface of the computerized calendaring system to cause each of the strips to independently scroll through a display of the calendar entries of a group associated with the strip according to the chronological order for that group and the passage of time.

10. The method of claim 9, wherein causing each of the strips to independently scroll through a display of the calendar entries of the group associated with the strip comprises:
- moving a first of the calendar entries out of a field of view of the strip in response to a scheduled time of the first of the calendar entries occurring in the past.

11. The method of claim 8, comprising allowing a user to filter the calendar entries based on at least one parameter selected by the user.

12. The method of claim 8, comprising displaying a notification area juxtaposition to at least one of the calendar entries, the notification area comprising a selectable button to allow a user to take an action through the selectable button.

13. The method of claim 8, further comprising displaying for each priority level, an additional strip for calendar entries with no associated deadline.

14. A method of displaying a plurality of calendar entries, comprising:
- dividing the calendar entries into a plurality of different priority levels in a computerized calendaring system implemented by at least one processor;
- for each priority level, displaying a portion of the calendar entries for that priority level in a separate strip of a user interface of the computerized calendaring system according to a chronological order;
- displaying a notification area in juxtaposition to at least one of the calendar entries, the notification area comprising a selectable button to allow a user to take an action through the selectable button;
- allotting space within a calendar displaying the calendar entries based on the priority level of the calendar entries, wherein calendar entries with lower priority occupy a smaller amount of a display area within the calendar and calendar entries with higher priority occupying a larger amount of the display area;
- in response to a determination that a newly-entered, high-priority event conflicts with a pre-existing, high-priority event, down-grading a classification of the newly-entered, high-priority event;
- in response to a determination that a pre-existing, high-priority event has been modified to remove a conflict, up-grading a classification of a medium-priority event to a high-priority event;
- displaying an amount of information for each of the calendar entries, wherein the amount of information displayed for each of the calendar entries is based on the priority level of the calendar entries, where lower-priority calendar entries comprise less information displayed and higher-priority calendar entries comprise more information displayed; and
- automatically reverting a scrolled strip after a predetermined period of time after scrolling a strip in response to a user command.

15. The method of claim 14, further comprising displaying for each priority level, an additional strip for calendar entries with no associated deadline.

\* \* \* \* \*